C. W. McKIBBEN.
METHOD OF AND MEANS FOR SEPARATING WATER FROM HEAVY OIL EMULSIONS.
APPLICATION FILED OCT. 24, 1918.
1,299,590.
Patented Apr. 8, 1919.
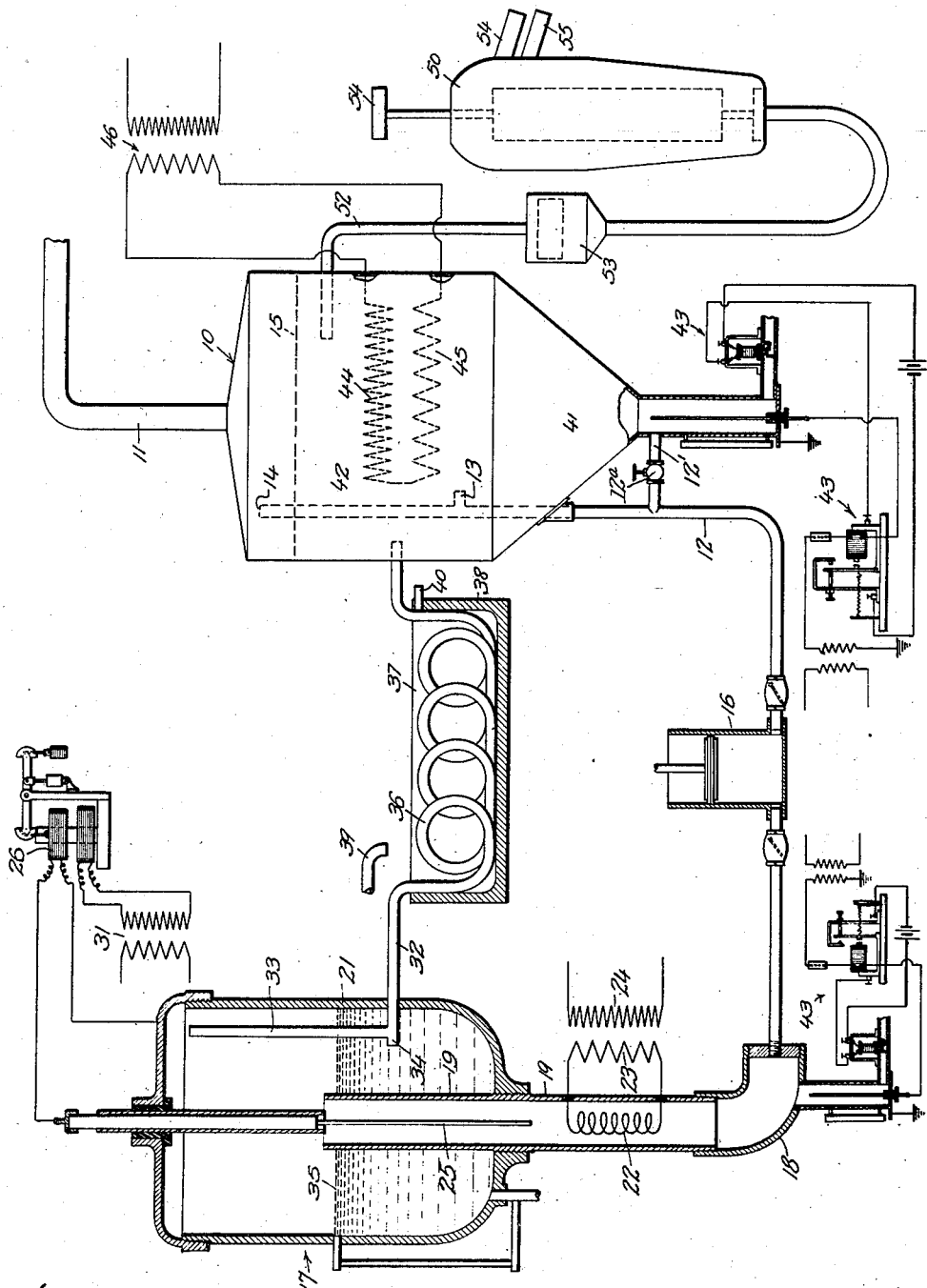

UNITED STATES PATENT OFFICE.

CHARLES W. McKIBBEN, OF HOUSTON, TEXAS.

METHOD OF AND MEANS FOR SEPARATING WATER FROM HEAVY-OIL EMULSIONS.

1,299,590.    Specification of Letters Patent.    Patented Apr. 8, 1919.

Application filed October 24, 1918. Serial No. 259,500.

*To all whom it may concern:*

Be it known that I, CHARLES W. MCKIBBEN, a citizen of the United States, residing at Houston, in the county of Harris and State of Texas, have invented certain new and useful Improvements in Methods of and and Means for Separating Water from Heavy-Oil Emulsions, of which the following is a specification.

My invention relates to a method of and means for separating water from heavy oil emulsions.

One of the objects of my invention is to reclaim oil from heavy oil emulsions.

In oil fields, where large quantities of oil or petroleum are stored in receiving tanks, there is always a great deal of heavy emulsions in the bottom of each tank, the accumulation of many years in some instances, and well known among oil men as "tank bottom." Oil is pumped from the wells into these tanks and taken therefrom, from time to time, always leaving an ever increasing quantity of tank bottom or heavy emulsified sludge in the bottoms of the tanks until this accumulation encroaches to an undesirable degree upon the oil holding capacity of the tank, when this residue is then drawn from the tank and thrown away.

The tank bottom in most fields contains from 20 to 30 per cent. of good oil, the recovery of which has heretofore been unattainable by any process within a cost limit justified by the commercial value of the reclaimed product.

My method of procedure, and the means employed, are concerned with the reclamation of this otherwise waste and worthless precipitate and other heavy emulsions and the conversion of all of their attainable oil content into valuable marketable product at an expense that is not prohibitory.

In carrying my mode of procedure into effect, I place a given quantity of the tank bottom or other highly viscous substantially immobile emulsion in a tank, and preferably maintain the quantity therein constant, regardless of the amount of purified oil and water thereafter discharged from the tank. I pump the contents of the tank from the tank through a treater, substantially such as disclosed in my Patent No. 127,687, granted August 20, 1918, and within the path of this moving residue I place a means for heating it to a temperature approximately 385 degrees Fahrenheit. This high temperature is permissible because the entire treatment is carried out in closed receptacles and conduits and the heated material by its own expansion produces a pressure of approximately 200 pounds per square inch.

The most effective heater for the purpose, I have found, is an electric conductor of relatively high resistance, preferably in the form of a coil, to be submerged directly in the body of the liquidescent mass, energized by a current of electricity, alternating preferred, to reduce the electrolysis to the lowest limit. The effect of this manner of heating the mass is to quickly produce a liquidescent condition of the viscous and relatively immobile body, at which time of heating, steam is generated from the water globules that directly impinge on the heated surface afforded by the electric coil, causing their rupture and the consequent violent ebullition causes conversion of part of the oil content into a vapor or gas.

From the treater, the flowing liquid and vapors or gases are passed through a condenser to reduce the gas to oil and to prevent the further evolution of the gas from the oil and to reduce the steam to free water. The separated liquids then flow back into the relatively large tank, from whence they came. In course of a short period of time the water will settle to the bottom of the tank, into a settling chamber provided therebelow, from which it may automatically be drawn off by means shown and claimed in my Patent No. 1,276,386 granted August 20th, 1918.

This cycle of operation will be continuously repeated, so long as the pump is kept in motion. To hasten subsidence of the water, the upper layers of liquids, within the tank, may coincidentally be carried into a centrifugal separator, or centrifuge, which has a separating property many times greater than gravity, from whence the oil is discharged divested of substantially all of the water with which it was previously so intimately associated.

Means may be provided for maintaining the quantity of sludge or heavy emulsion in the tank substantially constant, by pumping into the tank the emulsion uniformly with the quantity of the discharged separated water and oil. The contents of the tank may be kept warm by the effect of a heater of any sort. This will hasten the precipitation of water, and the solids held in mechanical suspension, when the centrifuge is not used. In any event I prefer to pass the associated liquids several times through the described cycle of operation before leaving them to settle in the tank by the effect of gravity.

The heat in the tank also amplifies the liquid state of its contents, rendering it more mobile so that it will more readily flow to the pump, at the time when the process is about to be put into operation.

By using an internal combustion engine and a low grade of oil as a fuel, the electricity necessary to produce the required heat in carrying my method of procedure into effect, may be developed at a very low cost.

The drawing illustrates one form of apparatus wherein my invention may be carried out.

In carrying my invention into effect, I may use a tank 10 into which I pump a suitable quantity of the heavy emulsion or tank bottom from a suitable source through the pipe 11, preferably direct from a storage tank or from a well. I take the heavy emulsion or sludge material from the tank through a pipe 12. This pipe may have an opening, as at 13, through which the heavier precipitate will flow and an opening 14 into which gas from the top of the tank, above the liquid line 15, may be taken. A pump 16 carries the liquid into a treater 17 through a relatively large elbow into a vertical conduit 19 of the treater, from which it flows into the chamber 20 within the casing 21. An electric heater 22, consisting, preferably, of a coil of relatively high resistance wire, or other poor conductor, is placed in the conduit 19 and is connected to the secondary of a low potential alternating transformer coil 23, which is in inductive relation to a relatively high potential coil 24, energized by a suitable source of electric power. After the emulsion is heated by the coil 22, it passes between the center electrode 25 and the interior of the pipe or conduit 19, by which it is further heated and the globules of water are polarized by the field induced therein by the transformer 26. The central conductor 25 may preferably be a gas pipe, about two inches in diameter, while the conduit 19, which is also an electric conductor, may be a similar pipe about six inches in diameter. The outer surface of the pipe 25 may be coated with porcelain or other suitable insulation 27 and the pipe secured in an insulator 28 in the cap or cover 29, of the casing 21. The cap 29 is preferably screwed tight upon the upper end of the casing so as to render it steam and gas tight. The transformer 26 is energized by the usual step up transformer 31. This feature of the apparatus and the treater 17, as illustrated herein are fully explained, described and claimed in my copending application, Serial No. 250,345 filed August 17th, 1918.

The liquid passes from the chamber 20 through the pipe 32, which has an opening for gas and steam, as at 33, at the upper end of the treater, and another opening 34 below the liquid line 35 in the treater, into a coil 36, which is surrounded by water 37 contained in a suitable receptacle 38. Relatively cold water is allowed to flow into the receptacle 38, through a pipe 39, pumped or otherwise, and to flow out through a pipe 40. The fluids and gases passing through the coil 36, that are cooled by the water 37 are thereby condensed and converted into free water and into oil, respectively. These liquids then flow into tank 10 in which, in the course of time, the water will gradually sink down into the water chamber 41 and the oil will rise to the top and be contained as an upper strata, as at 42. Means for automatically discharging the precipitated water from the chamber 41 is shown, as at 43, and consists substantially of the apparatus shown and described in my Patent No. 1,276,386 dated August 20th, 1918.

Means for heating the liquid within the tank 10 may be provided and may consist of the coils 44 and 45, heated by the transformer 46. Now if the oil and water are continued to be forced to flow through the system thus described, by the pump 16, the oil will continue to become more and more purified by the separation of the water therefrom and the precipitated free water will constantly and automatically be discharged, as it settles to the bottom of the tank 10, through the apparatus 43. But if the process is desired to be hastened, so that the separation may be effected by means much more powerful than the effect of gravity, and with greater celerity, then the centrifugal separator 50 may be employed. The oil will then pass from the tank 10 through the pipe 52 into the float chamber 53 of the separator. The float in the chamber 53 maintains the oil in the rotatable bowl of the separator at a constant head. The bowl is rotated by a pulley 54 at a relatively high speed. The effect of the centrifugal action is to cause the purified oil to flow out of the pipe 54 and the water and other refuse to flow out of the pipe 55.

A great deal of the freed water will immediately descend in the bottom of the tank 10, as the liquid is passed through the tank and will be discharged by the apparatus 43 at the bottom of the tank, but there is some of the water that has been placed in a state by the electric treater which will separate in the course of time, from the oil, by the effect of the high potential field through which it has passed, and which requires an elapse of time for the gravity to have the desired effect upon it, or which requires an action somewhat greater than that possessed by gravity, to hasten the subsidence, such as the centrifugal apparatus for effecting the separation.

I, therefore, may continue the operation of the process, by moving the liquid continuously through the paths described, until practically all of the liquid has been so treated and then let it remain for awhile in the tank 10, so that the water will gradually settle to the bottom and be automatically discharged therefrom periodically from time to time, or I may increase the capacity of the apparatus and hasten the process by continuing the passage of the liquids through the paths described and coincidentally permit them to flow into the centrifugal device 50 to enforce subsidence of the water in much shorter time, by the more positive means.

In the treater there is created an intense electric field, which polarizes the entrapped globules of water and tends to form them into chains. There is applied a disturbing stress to the nascent chains by the rapid movement of the liquids, which ruptures the oil envelops to some extent, and causes coalescence of the minute particles, or drops of water, into larger bodies of free water. The water thus freed, would subsequently slowly gravitate to the bottom of the liquid mass and ultimately become entirely disassociated from the purified oil of the emulsion, by gravitational subsidence, owing to the peculiar effect produced by the electric field. This effect is intensified by the high temperature to which the oil and water have been subjected, rendering the separation much more effective and converting, by condensation, the respective vapors, due to the heat, into their original constituents. This decreases the cohesive effect of the water particles for the oil, causing ready coalescence thereof into larger bodies of free water and which does not become again entrapped in the oil filaments.

My entire process is carried into effect with the oil completely protected from the atmosphere and the light of the sun. When oil is therefore taken fresh from the well into my system of purification, there are a number of gas fractions that are condensed into useful oil that would otherwise escape from the oil and be lost.

In many oil emulsions the water content does not carry sufficient salt to render them electrical conductors to a desirable extent. I have found that free salt water may be passed through the treater with the emulsion to reduce its electrical resistance and to hasten the treatment of the emulsion.

In a system such as described, I may take salt water from the bottom 41 of the tank 10, through the pipe 12' to the pipe 12 in quantities regulated by the valve 12ª, or salt water from any other source in desired amounts may be admitted into pipe 12.

Having described my invention, what I claim is:

1. The art of treating heavy emulsified oils to separate the water content therefrom, which consists in heating the emulsion to a vaporizing point; continuously passing the liquid thereof through an intensified electrical field after being heated; condensing the vapors and cooling the liquids below the vaporizing point and permitting subsidence of the water in a chamber in which the liquids are contained and automatically discharging the water from the chamber.

2. The art of treating heavy emulsified oils to separate the water content therefrom, which consists in heating the emulsions to a temperature above the boiling point of water; continuously passing the liquids thereof through an intensified electric field, after being heated; condensing the vapors and cooling the liquids below the vaporizing point; permitting subsidence of the water in a chamber in which the liquids are contained and automatically and periodically discharging the precipitated water from the chamber.

3. The art of treating heavy emulsified oils to separate the water content therefrom which consists in heating the emulsion to a temperature above the boiling point of the water; continuously passing the liquid thereof through an intensified electrical field after being treated; condensing the vapors and cooling the liquids below the vaporizing point; and forcibly producing subsidence of the water by centrifugal effect of the associated liquids and separating the liquids.

4. The art of treating heavy emulsified oils to separate the water content by a continuous process which consists in heating the emulsion to a temperature above the boiling point of water; passing successively portions of the associated liquids through an intense electrified field; condensing the resulting vapors and cooling the liquids so treated, and maintaining the moving liquids and vapors at a pressure above atmosphere during the entire cycle of operation.

5. The art of treating every emulsified oil to separate the water content by a continuous process, which consists in heating the emulsion to a temperature above the boiling point of water; passing successively portions of the associated liquids through an intense electrified field; condensing the resulting vapors and cooling the liquid so treated; maintaining the moving liquids and vapors at a pressure above atmosphere during the entire cycle of operation and forcibly producing separation of the liquids.

6. The art of treating heavy emulsified oil to separate the water content by a continuous process, which consists in heating the emulsion to a temperature above the boiling point of water; passing successively portions of the associated liquids through an intense electrified field; condensing the resulting vapors and cooling the liquids so treated; maintaining the moving liquids and vapors at a pressure above atmosphere during the entire cycle of operation; reducing the pressure thereon and then forcibly producing separation of the liquids.

In testimony whereof I hereunto subscribe my name.

CHARLES W. McKIBBEN.